United States Patent

[11] 3,580,982

[72] Inventor Jamshed Behram Havewala
 Newark, Del.
[21] Appl. No. 887,135
[22] Filed Dec. 22, 1969
[45] Patented May 25, 1971
[73] Assignee Haveg Industries, Inc.
 Wilmington, Del.

[54] POLE RISER GUARD—BACK-UP PLATE COMBINATION
 8 Claims, 3 Drawing Figs.
[52] U.S. Cl. .................................... 174/45, 174/38
[51] Int. Cl. .................................... H02g 7/20
[50] Field of Search........................... 174/5, 16, 38, 45, 135, 136, 48, 68 (C), 70.3, 72 (C), 95, 97, 101

[56] References Cited
UNITED STATES PATENTS
| | | | |
|---|---|---|---|
| 955,753 | 4/1910 | Brown et al................. | 174/97X |
| 1,923,825 | 8/1933 | Herz........................... | 174/45 |
| 2,230,734 | 2/1941 | Van Antwerp............... | 174/45 |
| 3,075,037 | 1/1963 | Schlein....................... | 174/45X |
| 3,162,720 | 12/1964 | Phillips........................ | 174/45 |
| 3,454,706 | 8/1969 | Willox......................... | 174/45 |

OTHER REFERENCES
"La-in" Catalog and Handbook, published by National Electric Products Corp., Pittsburgh, Pa., 1938, page 67 relied on copy in 174— 101.

Primary Examiner—Laramie E. Askin
Attorney—Sheldon F. Raizes

ABSTRACT: A pole riser guard and backup plate combination which is attached to a power pole and surrounds electrical cable. The backup plate is generally channel-shaped and is secured to the pole and the guard extends over the backup plate and receives the backup plate therein whereby the cable is protected by the backup plate from instruments inserted between the guard and the pole.

Patented May 25, 1971 3,580,982

INVENTOR.
JAMSHED BEHRAM HAVEWALA
BY Sheldon F. Raizes
ATTORNEY

POLE RISER GUARD—BACK-UP PLATE COMBINATION

DESCRIPTION

A primary object of this invention is to provide a pole riser package which encloses a power cable extending alongside a utility pole and will prevent a vandal or child from gaining access to the cable with a sharp instrument thereby damaging the cable or causing accidental electrocution of the vandal or child.

Other objects and advantages may be obtained from the following description where:

Figure 1:
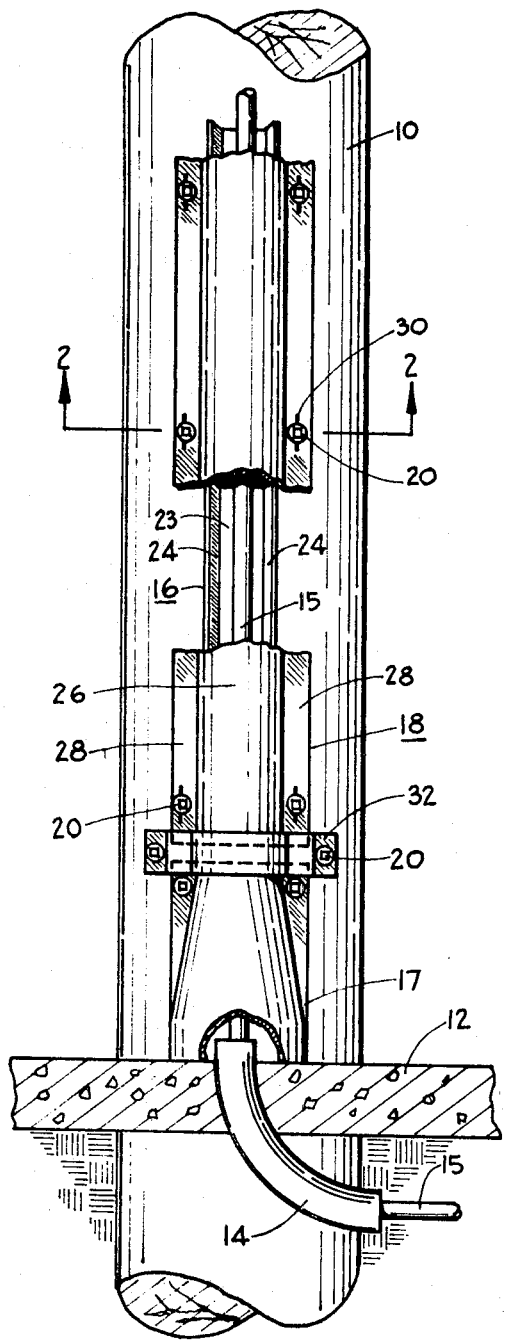
FIG. 1 is a side view with a breakaway portion showing a guard and backup plate installed on a pole for protecting a cable.

Referring to FIG. 1, a utility pole 10 extends out of a concrete base 12 and a cable jacket 14 is embedded in the concrete base 12. A cable 15 extends through the jacket 14 and projects out of the jacket 14 upwards along the pole. The cable 15 is received in a backup plate 16 which is secured to the pole by any well known means such as lag bolts, nails, screws, etc.

A large protector 17 is located at the lower portion of the pole with the lower end thereof abutting the concrete base 12. The boot is approximately 1½ feet long and is of an oversized configuration at the bottom thereof to allow for bringing the cable from the jacket 14 up against the pole 10. A protector guard member 18 extends upwards from the boot 17 for approximately 20 feet. The upper end of the boot conforms to the shape of the guard. The guard 18 and the boot 17 each receives the backup plate 16 therein and covers the cable 15 and is secured to the pole 10 by any well-known means such as lag bolts 20.

The backup plate 16 is channel shaped in cross section and comprises a rear wall portion 23 and a pair of sidewalls 24 which are at an obtuse angle with the rear wall 23. The wall 23 can be either flat or slightly curved to conform with the curvature of the surface of the pole 10. Nails are driven through the rear wall 23 to secure the backup plate to the pole 10.

The guard member 18 is generally hat-shaped in cross section and comprises a central curved or crown portion 26 which merges with a pair of flanges 28 at each lateral side thereof. The flanges are located at an angle to fit the contour of an ordinary utility pole 10.

The guard 18 and backup plate 16 are preferably made of polyvinyl chloride. The thickness of the guard is such that the guard is rigid while the thickness of the backup plate is such that it is slightly flexible. The curved inner surface 25 joining the flange 28 with the crown portion 26 acts as a camming surface upon securing the guard to the pole 10. The distance between the free edge of the sidewalls 24 of the backup plate is slightly greater than the inside width of the crown 26 of the guard and about the same as the distance between the camming surface 25. In assembly, the backup plate is secured to the pole 10, the cable is strung in place, and then the guard is secured in place. Upon assembly of the guard, each camming surface 25 engages a respective free edge of a respective wall 24 and biases the wall inwardly so the backup plate is received within the confines of the crown portion 26 and the walls are biased into engagement with the inner surface of the crown portion 26.

The slots 30 are provided in the guard 18 to allow for expansion and contraction movement of the guard relative to the pole. A strap 32 is placed over the space between the guard and the upper end of the boot to protect the cable 13 and is secured to the pole by lag bolts 20.

Figure 3:
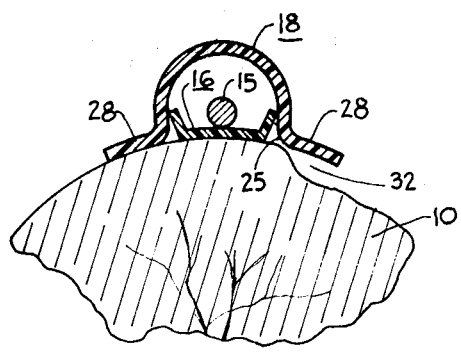
FIG. 3 is a section view similar to that of FIG. 2.
Figure 2:
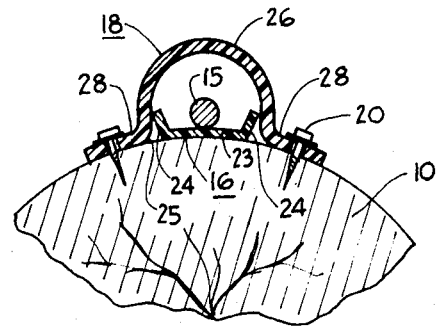
FIG. 2 is a section view taken along section line 2-2 of FIG. 1.

There are many irregularities on the surface of the pole 10 which prevents a tight or close fit between the flanges 28 and the surface of the pole resulting in many gaps or spaces as shown at 32 in FIG. 3. There is always the possibility that vandals or an innocent child might slip a knife or sharp instrument into the space 32 between the flange 28 and the surface of the pole 10 and damage the cable and/or electrocute himself.

The purpose of the backup plate is to protect the cable 15 from damage by vandalism and to protect children from being accidentally electrocuted. The sidewalls 24 of the backup plate 16 prevent any instrument from striking the cable. The backup plate 16 extends on the pole a sufficient height above the ground where it is assumed that a vandal or chile can not reach. Normally the height is about ten (10) feet.

It is preferred to have a tight fit between the guard and backup plate for alignment of the various guard sections and this construction provides continuous peripheral protection for the cable 15. However, if these features are not desirable, then it is not necessary to have a tight fit as long as the walls 24 extend into the crown portion 26 far enough to protect the cable from an instrument inserted into the space 32. The backup plate 16 can also be channel-shaped in the form of a semicircle or similar shape with the sides thereof engaging the inside surface of the crown portion 26. Obviously, a backup plate of this configuration will serve as an effective protector.

I claim:

1. In combination: a utility pole extending out of the ground, an elongated backup member secured to said pole being channel shaped in cross section, the channel being defined by an open front portion and a closed rear portion, said channel comprising a pair of sidewalls each merging into said rear portion located intermediate said sidewalls, at least a portion of said rear portion engaging said pole, said sidewalls extending in a direction away from said pole, at least one cable located within the confines of said channel, a protector guard secured to said pole independently of said backup member and generally hat-shaped in cross section with flanges at each side and a crown portion located intermediate and merging into said flanges, the inner surface of said flanges substantially engaging said pole, said backup member being substantially received within the inner confines of said crown portion of said protector guard.

2. The combination of claim 1 wherein said rear portion of the channel is generally planar.

3. The combination of claim 1 wherein the channel is defined by a generally U-shaped wall in cross section.

4. The combination of claim 2 wherein said sidewalls and said rear portion comprising the channel are generally planar and the sidewalls are at an obtuse angle with said rear portion.

5. The combination of claim 1 wherein the length of the backup member is substantially less than said protector guard and one end of the backup member is in the vicinity of the ground.

6. The combination of claim 1 further comprising a protector boot which is secured to said pole, receives an elongated portion of said backup member therein, is located between the ground and said protector guard, and the upper end of said boot is contiguous the lower end of said protector guard.

7. The combination as recited in claim 1 wherein said flanges and crown portion are joined by a curved portion, said backup member being flexible, said walls being resiliently urged outwardly into engagement with the inner surface of said crown portion.

8. The combination of a pole riser protector guard and a backup member for protecting cables secured to utility poles extending out of the ground comprising: said protector guard being elongated and generally hat shaped in cross section with securing flanges at each side and a crown portion located intermediate said flanges, said flanges and crown portion being joined by a respective curved portion, the inner surface of said curve portion comprising a camming surface, said protector guard being so proportioned and shaped that the inner surface of said flanges will substantially engage the pole; said backup member being elongated and being channel shaped in cross section, the channel being defined by an open front portion and a closed rear portion, said channel comprising a pair of sidewalls each merging into said rear portion located intermediate said sidewalls, the distance between the free edges of said backup member walls being of about the same dimension as the distance between said camming surfaces, said backup member being flexible whereby upon assembly of the guard and backup member to the pole said camming surfaces will engage said free edges and bias the walls inwardly to be received within the confines of and engage the inner surface of said crown portion.